United States Patent [19]

Stein

[11] Patent Number: 5,106,570
[45] Date of Patent: Apr. 21, 1992

[54] INTENSE NEGATIVE ION SOURCE

[75] Inventor: Charles Stein, Albuquerque, N. Mex.

[73] Assignee: The United States of America as represented by the Secretary of the Air Force, Washington, D.C.

[21] Appl. No.: 562,061

[22] Filed: Aug. 2, 1990

[51] Int. Cl.⁵ .............................................. G21B 1/00
[52] U.S. Cl. .................................... 376/129; 376/127; 376/130
[58] Field of Search ........................ 376/129, 130, 127; 250/424

[56] References Cited

U.S. PATENT DOCUMENTS

| | | | |
|---|---|---|---|
| 3,424,904 | 1/1969 | Donnally | 376/129 |
| 4,093,858 | 6/1978 | Kobayashi et al. | 250/424 |
| 4,361,761 | 11/1982 | Treglio | 250/251 |
| 4,447,761 | 5/1984 | Stinnett | 315/111.81 |
| 4,581,195 | 4/1986 | Akimune | 376/129 |
| 4,649,278 | 3/1987 | Chutjian et al. | 250/423 R |
| 4,654,183 | 3/1987 | Hershcovitch | 376/130 |
| 4,757,237 | 7/1988 | Hellblom et al. | 315/111.81 |
| 4,845,367 | 7/1989 | Amirav et al. | 250/424 |

*Primary Examiner*—Brooks H. Hunt
*Assistant Examiner*—Meena Chelliah
*Attorney, Agent, or Firm*—Bobby D. Scearce; Donald J. Singer

[57] ABSTRACT

A method for generating a beam of negatively charged hydrogen ions is described which comprises the steps of providing a source of metal hydride, heating the hydride to extract either atomic hydrogen or negative hydrogen ions directly therefrom, directing an electron beam onto the hydride or applying electrical charge to the hydride in order to ionize the hydrogen atoms or to prevent the ions from losing charge, and electrically accelerating the negative hydrogen ions so produced as a directed beam.

8 Claims, 1 Drawing Sheet

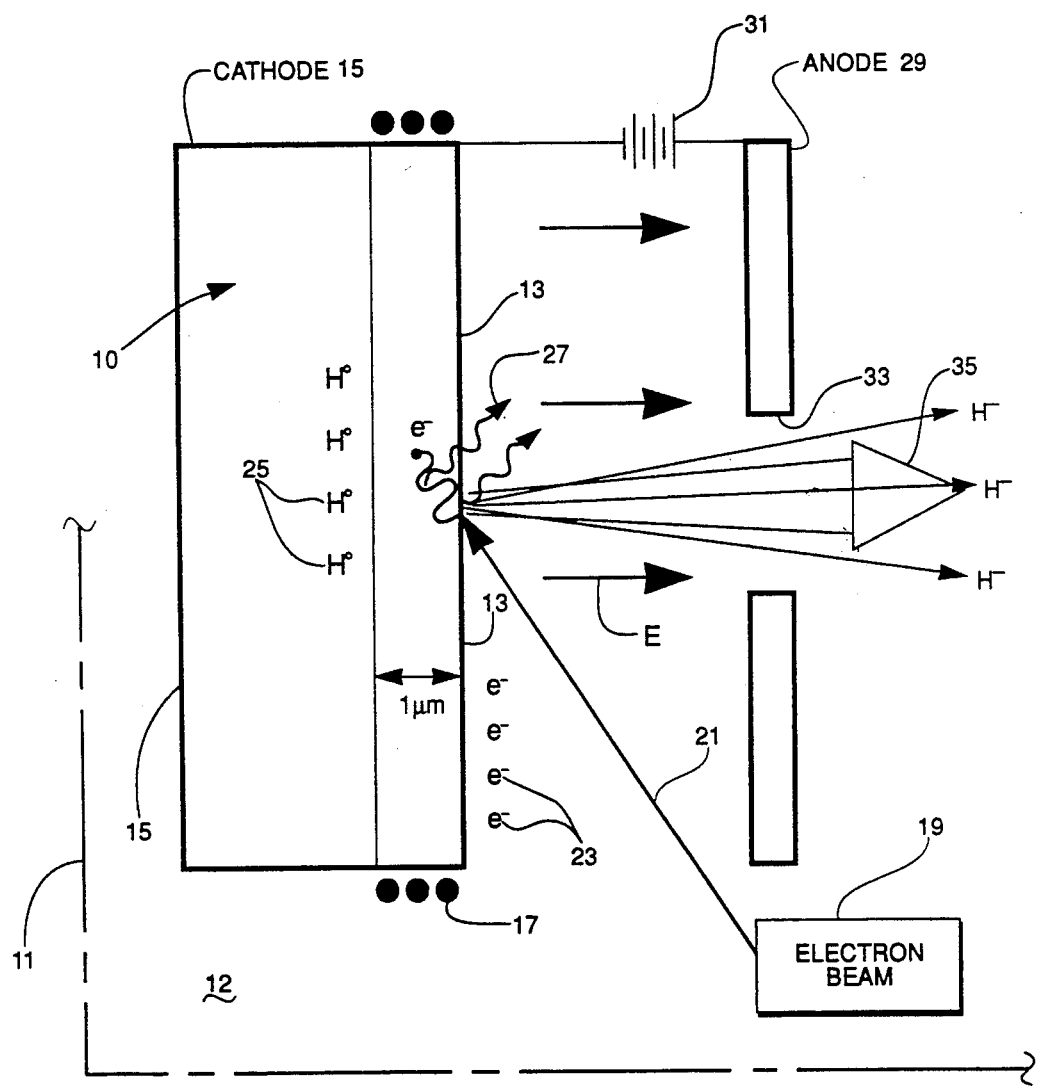

INTENSE NEGATIVE ION SOURCE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and processes for generating particle beams, and more particularly to a system and method for producing a dense source and beam of negatively charged hydrogen ions.

Intense beams of negative ions have substantial use in applications such as low energy kinetic studies, material property studies, high energy accelerator applications, fast neutral beam generation for controlled thermonuclear fusion studies and directed energy beam weapon devices. Processes for producing negative hydrogen ions may be classified as four general types, viz., double charge exchange for converting a positive ion beam into a negative ion beam, surface generation of negative ions from charged particle bombardment, laser focus generation and electrical discharge generation, which usually involve one or more of hydrogen plasma generation, arc production at high currents and voltages, high magnetic field generation or hydrogen excitation and electron capture. Prior art processes generally lack capability for generating beams of intensity sufficient for intense negative ion sources or for fast neutral beam generation and are usually pulsed devices with low duty factors.

The invention provides a method for generating an extremely dense source of atomic or ionic hydrogen for generation of an intense negative hydrogen ion beam. Atomic or ionic hydrogen is extracted from a metal hydride by electrical resistance, electron beam, microwave or laser heating. An electron beam is directed against the surface of the hydride or a charge is applied to the hydride in order to ionize the hydrogen atoms or to prevent the ions from losing charge, and ions so produced are then accelerated electrically as a directed beam.

It is therefore a principal object of the invention to provide a method for generating a particle beam.

It is a further object of the invention to provide a method for directly producing an intense source of negative hydrogen ions.

It is yet a further object of the invention to provide a method for directly producing a negative hydrogen ion beam.

These and other objects of the invention will become apparent as a detailed description of representative embodiments proceeds.

SUMMARY OF THE INVENTION

In accordance with the foregoing principles and objects of the invention, a method for generating a beam of negatively charged hydrogen ions is described which comprises the steps of providing a source of metal hydride, heating the hydride to extract either atomic hydrogen or negative hydrogen ions directly therefrom, directing an electron beam onto the hydride or applying electrical charge to the hydride in order to ionize the hydrogen atoms or to prevent the ions from losing charge, and electrically accelerating the negative hydrogen ions so produced as a directed beam.

DESCRIPTION OF THE DRAWINGS

The invention will be more clearly understood from the following detailed description of representative embodiments thereof read in conjunction with the accompanying drawing which illustrates a hydrogen ion source and beam generation method according to the invention.

DETAILED DESCRIPTION

Referring now to the drawing, shown therein is a schematic of a hydrogen source and associated equipment for extraction of negatively charged ionic hydrogen as a beam according to the invention. According to a governing principle of the invention, a very high density region of hydrogen atoms is generated near the surface of a hydride where electrons, generated by either a high electric negative charge on the hydride or by a low energy electron beam, can interact with neutral hydrogen atoms to form $H^-$ ions according to the reaction, $$H^o + e^- = H^- \tag{1}$$

Source 10 in one embodiment comprises a metal hydride which can store a substantial quantity of atomic hydrogen. For example, the hydrogen density of $TiH_2$ ($9.2 \times 10^{22}$ atoms/cc) is greater than that of solid hydrogen at 4.2° K. ($5.3 \times 10^{22}$ atoms/cc) or of liquid hydrogen at 20° K. ($4.2 \times 10^{22}$ atoms/cc). Other binary and ternary metal hydrides suitable for use as source 10 may be selected by the skilled artisan guided by these teachings and may include the $AB_5$ hydrides such as $LaNi_5$, $LaFe_5$, Ca Misch Metal $Ni_5$, $LaAlN_5$, and the like, and binary hydrides such as $TiH_2$, $VH_2$, $LaH_2$, $ZrH_2$ and the like. Many of the ternary hydrides have a formation enthalpy smaller than that of $TiH_2$ and therefore produce larger partial pressures of hydrogen over the metal hydride. For example, TiFeH, when heated to 55° C. will decompose to produce a partial pressure of hydrogen of about 10 atm. Upon dissociation of the hydride, atomic hydrogen $H^o$ diffuses rapidly to the surface of the hydride. For example, the hydrogen diffusion coefficient in niobium at room temperature is $10^{-5}$ cm$^2$/sec. Judicious choice of metal hydride will therefore allow control of hydrogen production from the hydride at a selected temperature. At the hydride surface, hydrogen atoms absorb sufficient (activation) energy to associate into pairs to form $H_2$ molecules, which is the only specie which can leave the surface, and which association is avoided in accordance with effective practice of the invention.

Other hydrides suitable for use as source 10 include alkali metal (saline) monohydrides including LiH, NaH, KH, RbH and CsH, and the alkaline earth metal dihydrides including $CaH_2$, $MgH_2$, $BeH_2$, $SrH_2$ and $BaH_2$. These hydrides store hydrogen as negative $H^-$ ions which may facilitate direct removal of the ions according to the invention, as by heating with an electron beam, and prevention of the combination of two H- ions into a neutral molecule.

Source 10 may be contained within a suitable enclosure 11 which provides a protective evacuated chamber 12 allowing generation of hydrogen ions at surface 13 of source 10. Source 10 may be encased in or operatively attached to cathode 15 providing negative bias on source 10 for preserving the negative charge on H⁻ ions produced and for providing in part means for accelerating the ions as a beam as described below. Heating means such as in the form of induction coil 17 may be operatively disposed near source 10 for heating source 10 hydrides and generating atomic or ionic hydrogen at surface 13.

Source 19 of electron beam 21 of selected energy is disposed near source 10 in order to provide energetic electrons 23 for interaction at surface 13 with neutral hydrogen atoms 25 from a corresponding $H^o$ producing hydride and to energize the $H^o$ atoms into H⁻ ions. For the saline hydrides which produce H⁻ ions directly upon heating with electron beam 21, the negative bias provided by cathode 15 maintains the energy level of the H⁻ ions and prevents them from losing charge. Source 19 may be a simple electron gun, preferably generating beam 21 of about 20–30 KeV, or other suitable source as would occur to the skilled artisan guided by these teachings. A low accelerating voltage is desired so that the cross section of electron beam 21 will favor interaction with $H^o$ atoms 25. Flexibility in varying the electron voltage of electron beam 21 allows control of the point of interaction with $H^o$ atoms For example, an electron beam of about 25 KeV penetrates about 1 micron of the hydride. At this level electrons 23 will slow and eventually stop in a thickness of the hydride in which there are about $10^{21}$ $H^o$ atoms/cc. Electron beam 21 is preferably directed against surface 13 at an angle in order to minimize the countercurrent interaction of the electrons against the H⁻ ions to mitigate stripping of electrons from the ions. Electron beams 21 of lesser accelerating voltage can be made to form a virtual cathode at or near the surface of the hydride. Electrons 23 can also be made available at and just below the hydride surface by charging the surface with a large negative potential of about 0 to 15 KeV on cathode 15.

Electrons impinging on the hydride will produce x-rays 27 at an escape depth which may be helpful in dissociating $H_2$ molecules produced at the hydride surface to H⁻ or $H^o$.

In addition to supplying electrons 23 for the ion reaction, electron beam 21 may also serve to heat hydride source 10. The production rate of $H^o$ atoms 25 from the hydride can be controlled since small changes in temperature produce large changes in the equilibrium partial pressure of hydrogen above the hydride (an increase from 300° C. to 400° C. will increase hydrogen pressure from 1 to 10 atm over the MgNiH system and for an increase of temperature of 70° C. will produce a change from 1 to 20 atm over the TiFeH system. Heating may be accomplished by other means such as $I^2R$ heating, laser heating, microwave heating, infrared heating, the heating means not considered limiting of the invention herein.

Anode 29 held at a higher potential than cathode 15 is disposed near surface 13 in order to generate a d.c. electric field E between anode 29 and surface 13 utilizing electrical source 31. Negative H⁻ ions at surface 13 may be accelerated by field E toward anode 29 and directed through aperture 33 as a directed beam 35 of H⁻ ions. Electric field strengths of about 0 to 15 kV will sufficiently accelerate the H⁻ ions as directed beam 35. Biasing of the anode provides additional control of beam 35.

The rate of formation of $H_2$ molecules from the surface of the hydride can be controlled by very thin (angstrom) films or contaminates including oxygen or nitrogen, or the oxide or nitride of the metal comprising the hydride source. These films slow the $2H^o$ to $H_2$ reaction so that the preferred reaction defined in Eq (1) can more readily take place.

The invention therefore provides methods for generating a negative hydrogen ion beam. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for generating a negative hydrogen ion beam comprising the steps of:
   (a) providing a source of metal hydride;
   (b) heating said source to dissociate said metal hydride and thereby generating one of a quantity of hydrogen atoms and a quantity of negative hydrogen ions at a surface of said hydride;
   (c) applying a negative electric charge to said surface of said metal hydride to ionize said hydrogen atoms and to maintain said ions as negative hydrogen ions; and
   (d) electrically accelerating said hydrogen ions as a directed beam.

2. The method of claim 1 wherein said hydrogen ions are electrically accelerated by the application of a d.c. electric field at said surface of said metal hydride.

3. The method of claim 1 wherein said step of applying an electrical charge includes directing an electron beam onto said surface of said hydride.

4. The method of claim 1 wherein said metal hydride is selected from the group consisting of the $AB_5$ hydrides, binary metal hydrides, the saline hydrides, and the alkaline earth metal hydrides.

5. A method for generating a negative hydrogen ion beam comprising the steps of:
   (a) providing a source of metal hydride;
   (b) directing an electron beam against a surface of said source and thereby generating negative hydrogen ions at said surface; and
   (c) electrically accelerating sad hydrogen ions as a directed beam.

6. The method of claim 5 further comprising the step of applying a negative electric charge to said surface of said metal hydride to prevent said negative hydrogen ions from losing charge.

7. The method of claim 5 wherein said hydrogen ions are electrically accelerated by the application of a d.c. electric field at said surface of said metal hydride.

8. The method of claim 5 wherein said metal hydride is selected from the group consisting of the $AB_5$ hydrides, binary metal hydrides, the saline hydrides, and the alkaline earth metal hydrides.

* * * * *